US011537320B2

(12) United States Patent
Sela et al.

(10) Patent No.: US 11,537,320 B2
(45) Date of Patent: Dec. 27, 2022

(54) STORAGE SYSTEM AND METHOD FOR HOST MEMORY ACCESS

(71) Applicant: Western Digital Technologies, Inc., San Jose, CA (US)

(72) Inventors: Rotem Sela, Haifa (IL); Amir Shaharabany, Kochav Yair (IL); Eliad Adi Klein, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/780,216

(22) Filed: Feb. 3, 2020

(65) Prior Publication Data

US 2021/0240389 A1    Aug. 5, 2021

(51) Int. Cl.
*G06F 3/06* (2006.01)
*G06F 12/10* (2016.01)
*G06F 21/60* (2013.01)
*G06F 1/3296* (2019.01)

(52) U.S. Cl.
CPC ............ *G06F 3/0659* (2013.01); *G06F 12/10* (2013.01); *G06F 1/3296* (2013.01); *G06F 3/0604* (2013.01); *G06F 3/0673* (2013.01); *G06F 21/602* (2013.01); *G06F 2212/657* (2013.01); *G09G 2360/125* (2013.01)

(58) Field of Classification Search
CPC ...... G06F 3/0659; G06F 12/10; G06F 3/0604; G06F 3/0673; G06F 2212/657; G06F 21/602; G06F 1/3296; G06G 2360/125
See application file for complete search history.

(56) References Cited

U.S. PATENT DOCUMENTS

| 8,935,465 | B1* | 1/2015 | Shaharabany | G06F 3/0679 711/103 |
| 9,176,673 | B2 | 11/2015 | Watanabe | |
| 2015/0286581 | A1* | 10/2015 | Lee | G06F 3/0623 713/189 |
| 2016/0011790 | A1* | 1/2016 | Rostoker | G06F 12/0862 711/103 |
| 2016/0364343 | A1* | 12/2016 | Case | H04L 9/0637 |
| 2017/0024266 | A1 | 1/2017 | Iwai | |
| 2017/0068480 | A1* | 3/2017 | Huang | G06F 3/0625 |
| 2017/0123722 | A1 | 5/2017 | Sela | |

(Continued)

OTHER PUBLICATIONS

"Demystifying the characteristics of 3D-stacked memories: A case study for Hybrid Memory Cube" by Ramyad Hadidi, et el, available online at https://ieeexplore.ieee.org/document/8167757 (Year: 2017).*

(Continued)

*Primary Examiner* — William E. Baughman
*Assistant Examiner* — Janice M. Girouard
(74) *Attorney, Agent, or Firm* — Crowell & Moring LLP

(57) ABSTRACT

A storage system and method for host memory access are provided. In one embodiment, a storage system is provided comprising a memory and a controller. The controller is configured to receive a write command from the host that is recognized by the storage system as a read host memory command; in response to receiving the write command, send an identification of a location in the host memory to the host; and receive, from the host, data that is stored in the location in the host memory. Other embodiments are provided.

19 Claims, 10 Drawing Sheets

(56) References Cited

U.S. PATENT DOCUMENTS

| | | | |
|---|---|---|---|
| 2017/0242606 A1 | | 8/2017 | Vlaiko et al. |
| 2017/0285940 A1 | | 10/2017 | Benisty et al. |
| 2018/0018101 A1 | | 1/2018 | Benisty et al. |
| 2018/0024738 A1 | | 1/2018 | Ngu et al. |
| 2018/0046371 A1 | * | 2/2018 | Kim .................. G06F 3/061 |
| 2018/0107614 A1 | | 4/2018 | Hong et al. |
| 2020/0012595 A1 | | 1/2020 | Bordia et al. |

OTHER PUBLICATIONS

"Pushing the Frontier in Managing Power in Embedded ASIC or SOC Design with PCI Express." by CC Hung, available online https://www.design-reuse.com/articles/17192/pci-express-managing-power.html. (Year: 2013).*

JESD220-1 (JEDEC Standard Universal Flash Storage (UFS) Unified Memory Extension Version 1.0, JESD220-1, Sep. 2013 ). (Year: 213).*

International Search Report dated Oct. 26, 2020 for International Application No. PCT/US2020/038153.

Written Opinion dated Oct. 26, 2020 for International Application No. PCT/US2020/038153.

Non-final Office Action dated Sep. 13, 2021 for U.S. Appl. No. 16/874,101.

International Search Report completed May 26, 2021 for International Application No. PCT/US2021/016330.

Written Opinion completed May 26, 2021 for International Application No. PCT/US2021/016330.

Israel Patent Office Search Strategy completed May 26, 2021 for International Application No. PCT/US2021/016330.

* cited by examiner

STORAGE SYSTEM AND METHOD FOR HOST MEMORY ACCESS

BACKGROUND

Due to the limited amount of volatile memory in a storage system, some storage systems use volatile memory in a host to compensate for its limited volatile memory resources. For example, storage systems that operate under the Universal Flash Storage (UFS) specification can use a Unified Memory Architecture (UMA) to provide the storage system with master access to portions of the host's volatile memory. UMA enables a UFS storage system to manage the host volatile memory through a set of low-level commands that are initiated by the storage system. Typically, UMA requires hardware changes to the controllers in both the host and the storage system.

DETAILED DESCRIPTION

Overview

Figure 1A:
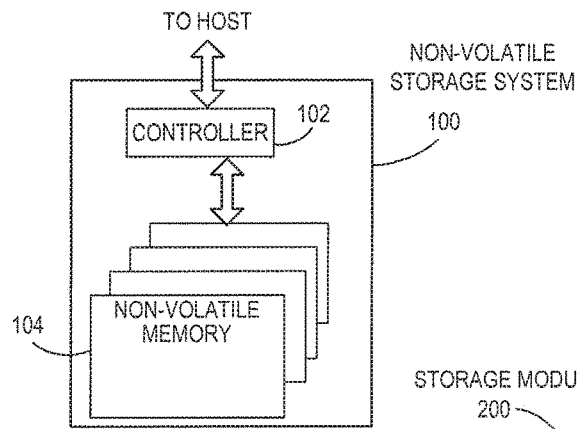
FIG. 1A is a block diagram of a non-volatile storage system of an embodiment.

By way of introduction, the below embodiments relate to a storage system and method for host memory access. In one embodiment, a storage system is provided comprising a memory and a controller. The controller is configured to receive a write command from the host that is recognized by the storage system as a read host memory command; in response to receiving the write command, send an identification of a location in the host memory to the host; and receive, from the host, data that is stored in the location in the host memory.

In some embodiments, the controller is further configured to receive a read command from the host that is recognized by the storage system as a write host memory command; and send data to the host to be written in the host memory.

In some embodiments, the write command comprises a first parameter that identifies a start address of an area of the host memory designated for use by the storage system and a second parameter that identifies a size of the area.

In some embodiments, the identification of the location in the host memory is sent as part of a ready-to-transfer response to the write command.

In some embodiments, the identification of the location in the host memory comprises an address offset and payload size.

In some embodiments, the host is configured to keep the write command open and ignore a timeout.

In some embodiments, the host memory comprises a first area designated for use by the storage system to read and write data, a second area designated for storing data read from the storage system by the host, and a third area designated for storing data to be written to the storage system by the host.

In some embodiments, the memory comprises a three-dimensional memory.

In some embodiments, the storage system is configured to be integrated in the host.

In some embodiments, the storage system is configured to be removably connected with the host.

In another embodiment, a method is provided that is performed in a storage system in communication with a host comprising host memory. The method comprises receiving, from the host, at least one of the following: a command to write data to the storage system and a command to read data from the storage system; and instead of executing the command(s) received from the host, performing at least one of the following: writing data to the host memory and reading data from the host memory.

In some embodiments, the data written to the host memory comprises a logical-to-physical address table.

In some embodiments, the data written to the host memory comprises data stored in a volatile memory in the storage system prior to a sleep or power-down operation.

In some embodiments, the data written to the host memory comprises read look-ahead data.

In some embodiments, the data written to the host memory comprises data to be written to the memory in the storage system.

In another embodiment, a storage system is provided comprising a memory; means for receiving a command from a host that establishes a communication channel between host memory in the host and the storage system; and means for, in response to receiving the command, writing data to and/or reading data from the host memory via the communication channel.

In some embodiments, the command comprises a command to write data to the memory that is recognized by the storage system as a read host memory command.

In some embodiments, the command comprises a command to read data from the memory that is recognized by the storage system as a write host memory command.

In some embodiments, the host can request the storage system to enter a sleep state while keeping several commands active.

In some embodiments, the storage system can signal the host whether the host-storage system link's low-power modes are enabled or disabled.

In some embodiments, the storage system can request the host-storage system link enter or exit low-power mode.

In some embodiments, the storage system can utilize the existing host's Advanced Encryption Standard (AES) inline encryption of written/read data for keeping the storage system data on the host memory encrypted.

In some embodiments, the host memory comprises volatile memory.

In some embodiments, the memory comprises a three-dimensional memory.

Other embodiments are possible, and each of the embodiments can be used alone or together in combination. Accordingly, various embodiments will now be described with reference to the attached drawings.

EMBODIMENTS

Figure 1B:
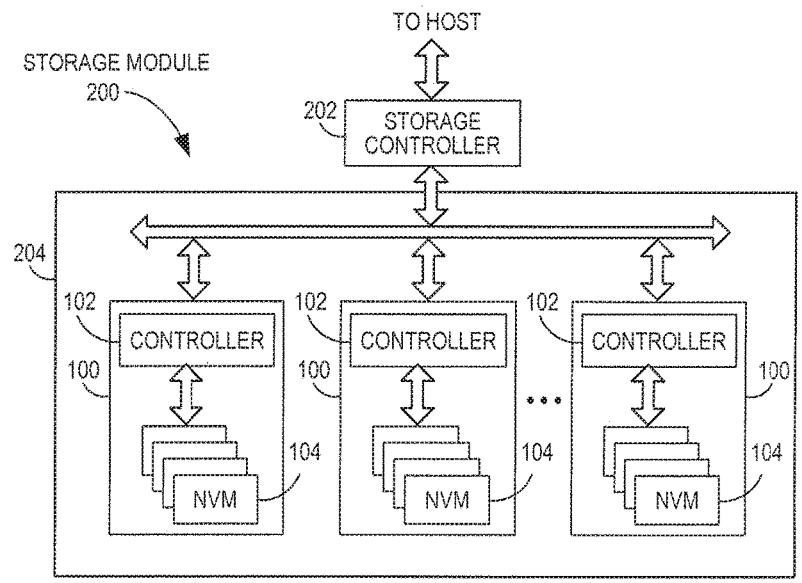
FIG. 1B is a block diagram illustrating a storage module of an embodiment.
Figure 1C:
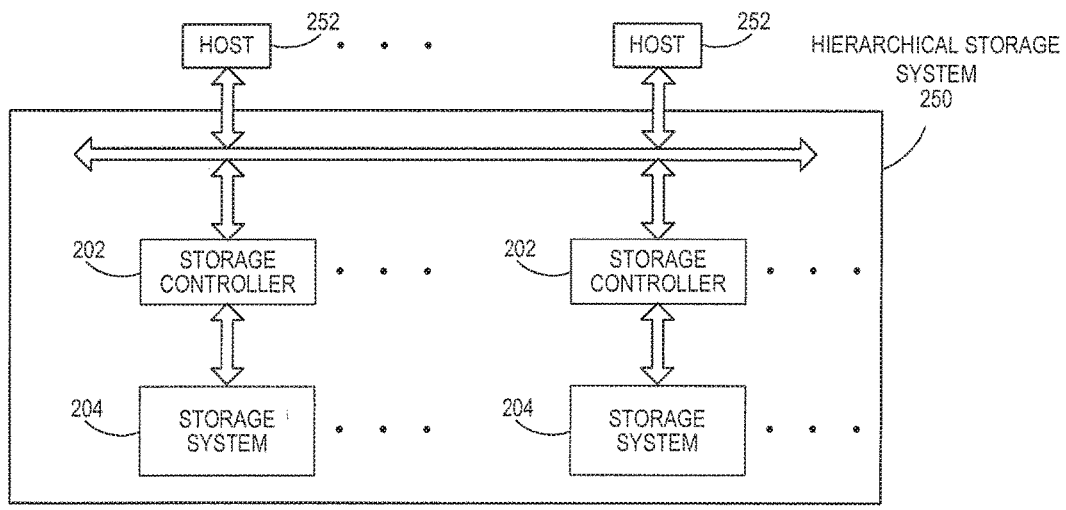
FIG. 1C is a block diagram illustrating a hierarchical storage system of an embodiment.

Storage systems suitable for use in implementing aspects of these embodiments are shown in FIGS. 1A-1C. Figure A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
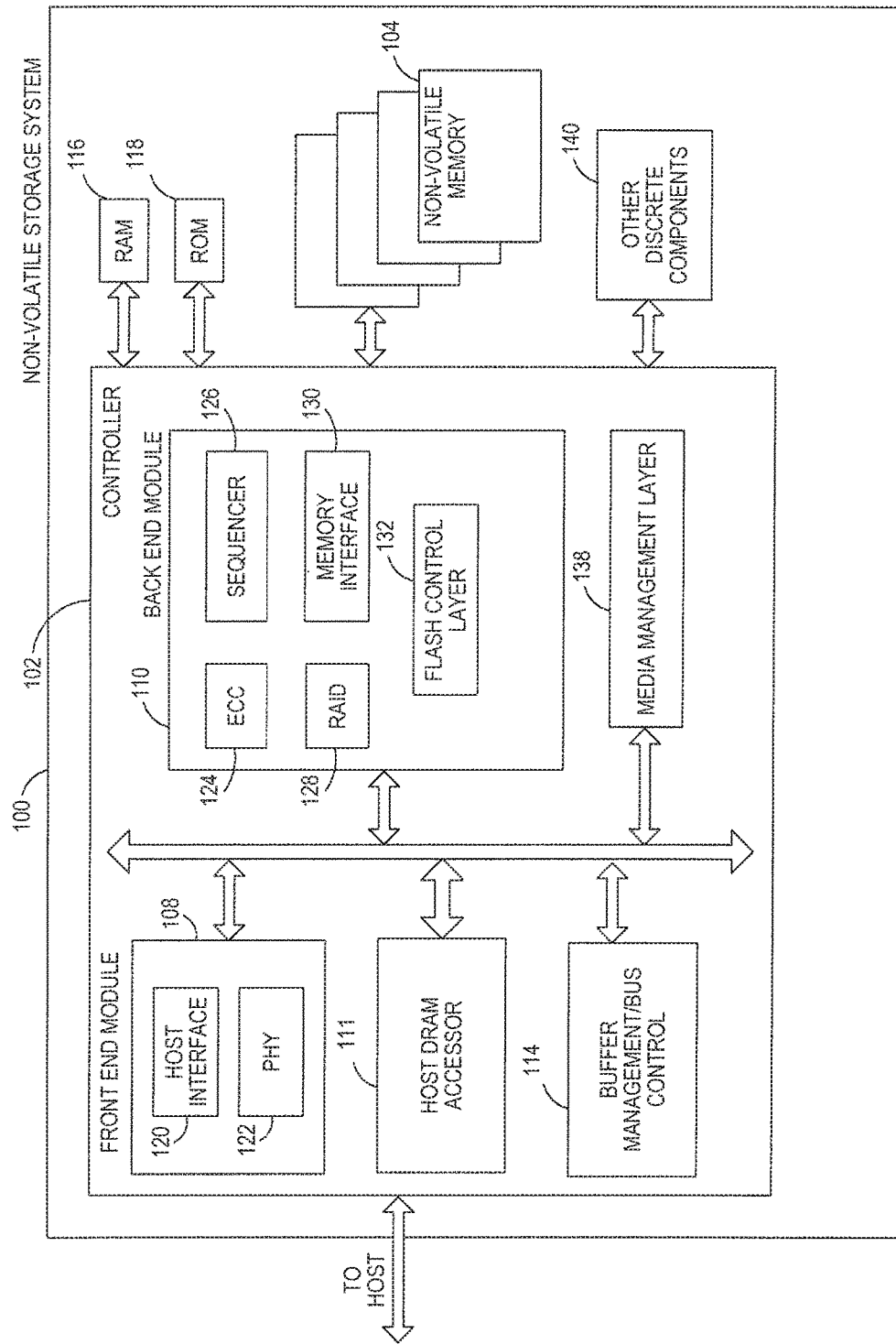
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a host DRAM accessor 111, which is discussed in more detail below, and can be implemented in hardware or software/firmware. The host DRAM accessor 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, Universal Flash Storage (UFS), SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
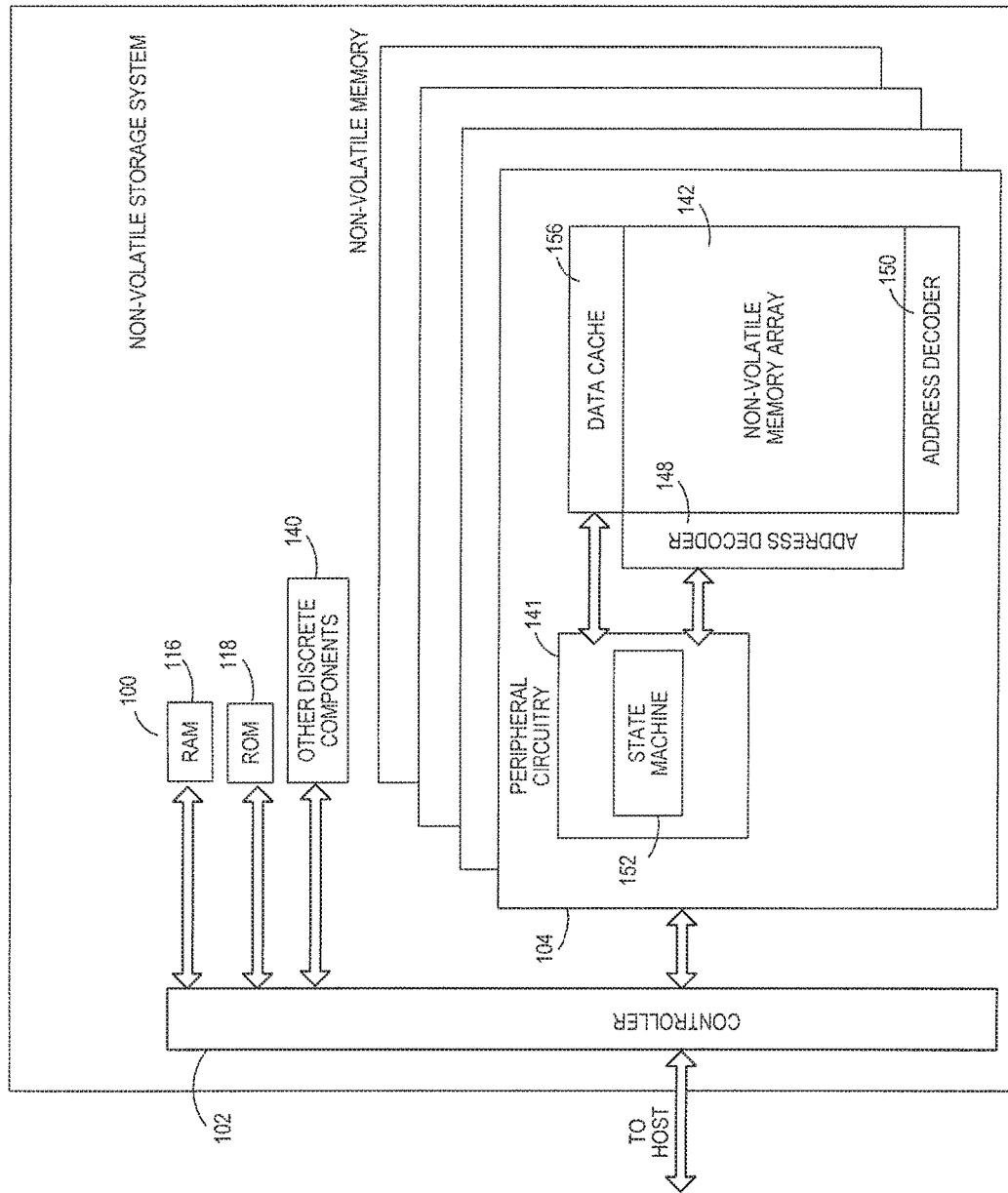
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3B:
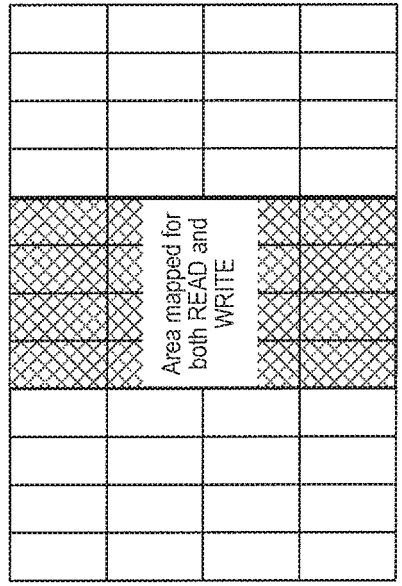
FIG. 3B is a block diagram illustrating direct memory access (DMA) read and write mapping of an embodiment.
Figure 3A:
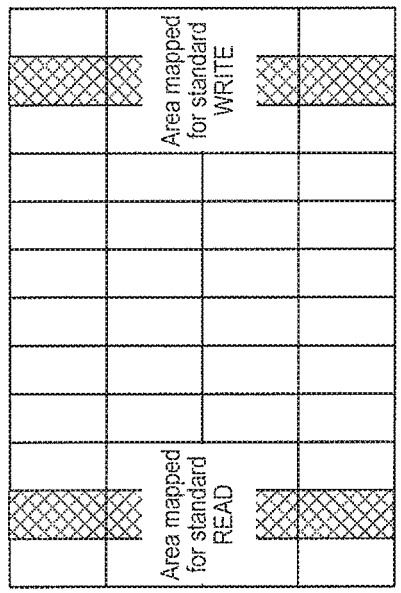
FIG. 3A is a block diagram illustrating standard read and write mapping of an embodiment.

As mentioned above, due to the limited amount of volatile memory (e.g., static random-access memory (SRAM)) in a storage system, some storage systems use volatile memory (e.g., dynamic random-access memory (DRAM)) in a host to compensate for its limited volatile memory resources. For example, as shown in FIG. 3A, host memory can have an area mapped for standard read operations (i.e., an area designated for storing data read from the storage system by the host) and an area mapped for standard write operations (i.e., an area designated for storing data to be written to the storage system by the host). However, as shown in FIG. 3B, the host memory can also have an area that is mapped for both read and write operations performed by the storage system (i.e., an area designated for use by the storage system to read and write data).

Different mechanisms can be used to allow the storage system to access this area in the host memory. For example, storage systems that operate under the Universal Flash Storage (UFS) specification can use a Unified Memory Architecture (UMA) to provide the storage system with master access to portions of the host's volatile memory. UMA enables a UFS storage system to manage the host volatile memory through a set of low-level commands that are initiated by the storage system. Typically, UMA requires hardware changes to the controllers in both the host and storage system. Because of this, UMA was never adopted by the industry.

The following embodiments can be used to provide a storage system with access to the host's volatile memory even in a UFS environment without hardware changes to the storage system and host, thereby overcoming the disadvantages of UMA while still providing its advantages and allowing these embodiments to be more easily adopted than UMA. Further, unlike UMA, which is initiated by the storage system, these embodiments can be initiated by the host. That is, in the UFS protocol, the host controller is the master, and the storage system is the slave. Hence, the storage system cannot initiate commands to the host master. However, in these embodiments, once a command is issued by the host master, the storage system controller slave determines when and how the data is transferred, and it allows the storage system to take control over data transfer operations. Further, these embodiments keep the host command open, essentially opening a communication channel between the host volatile memory and the storage system's controller, where the storage system's controller will be able to master the data transfers from/to the host's volatile memory.

It should be noted that while these examples are discussed in terms of a UFS storage system, these embodiments can be used with any storage system, and the claims should not be limited to UFS. It should also be noted that while some of the below examples refer to the host's volatile memory as DRAM and the storage system's volatile memory as SRAM, other types of memory can be used in the host and/or storage system.

In one embodiment, the storage system 100 (e.g., the controller 102) receives a command from the host that establishes a communication channel between host memory in the host and the storage system 100. In response to this command, the controller 102 can write data to and/or read data from the host memory via the communication channel. That is, unlike the UMA process, which is initiated by the storage system, the opening of the communication channel in this embodiment is initiated by the host.

The command sent by the host to open the communication channel can take any suitable form. For example, as shown in the flow diagram 400 in FIG. 4, in one embodiment, the host 50 sends a standard write command to the storage system 100 as a Universal Flash Storage Protocol Information Unit (UPIU) command. The command parameters for the write command can be command name (e.g., Read Host Memory), start address (the starting physical address of the host memory), and allocation length (the size of the allocated range in the host memory).

Figure 4:
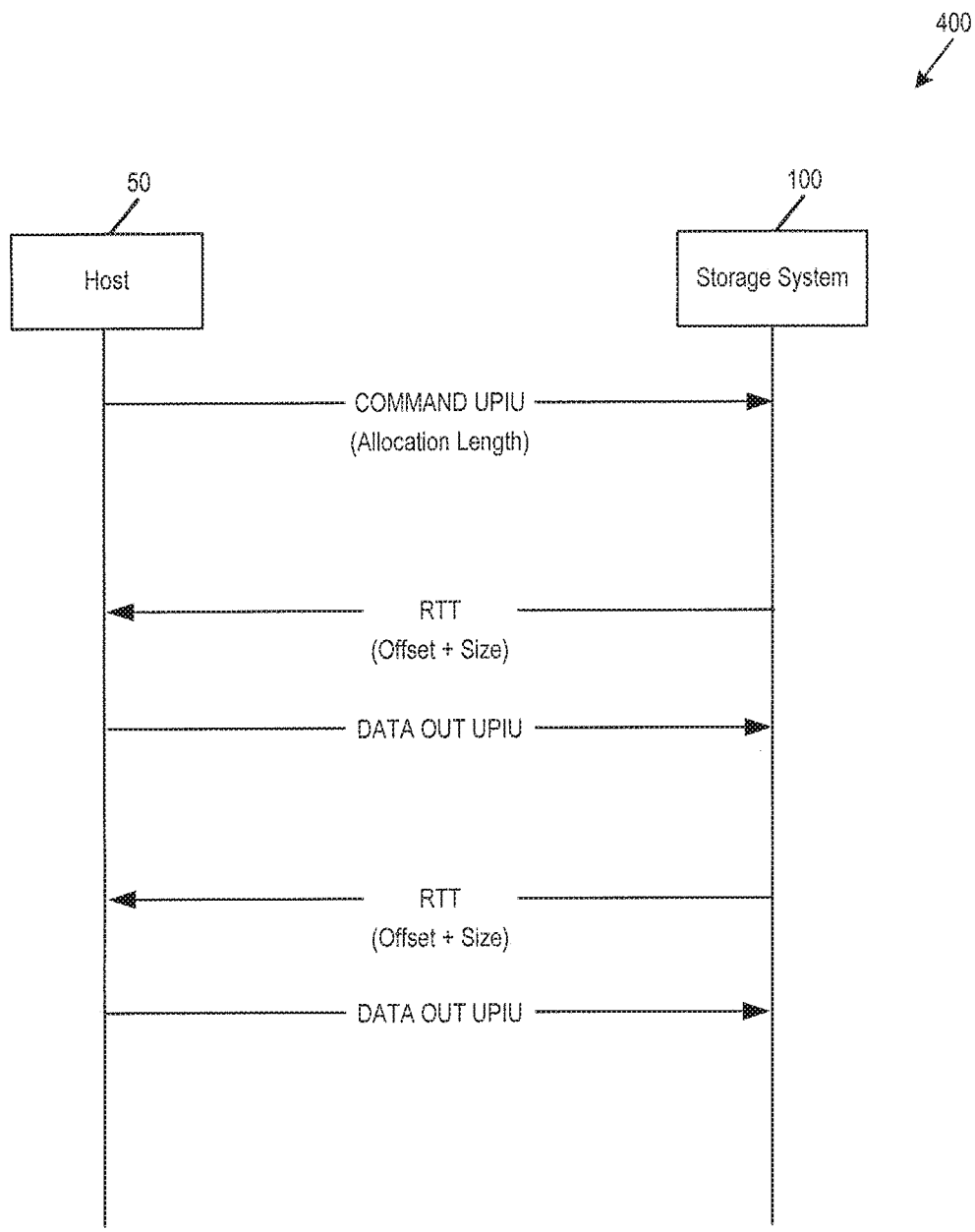
FIG. 4 is a flow diagram of an embodiment for a read host memory command.

When the storage system 100 receives such a write command, it recognizes the write command as a read host memory command and does not execute the stated write command (if the write command contains a logical block address or data, the storage system 100 can ignore those items). Instead, in response to receiving the write command, the storage system 100 sends a command to read the host memory by sending the host 50 an identification of a location in the host memory that the storage system 100 wants to read. For example, as shown in FIG. 4, the identification of the location in the host memory can be sent as part of a ready-to-transfer (RTT) response to the write command and can comprise an address offset and payload size. In response to receiving that information, the host 50 sends the requested data to the host (e.g., via a Data Out UPIU signal). In one embodiment, the host is configured keep the write command open and ignore timeouts, so the storage system 100 can keep sending requests to read data from the host memory at will. The response UPIU to close out the write command can be sent from the storage system 100 during power off, for example. In this way, the communication channel will be kept open as long as the host wants to allow the storage system 100 access to the host memory.

Figure 5:
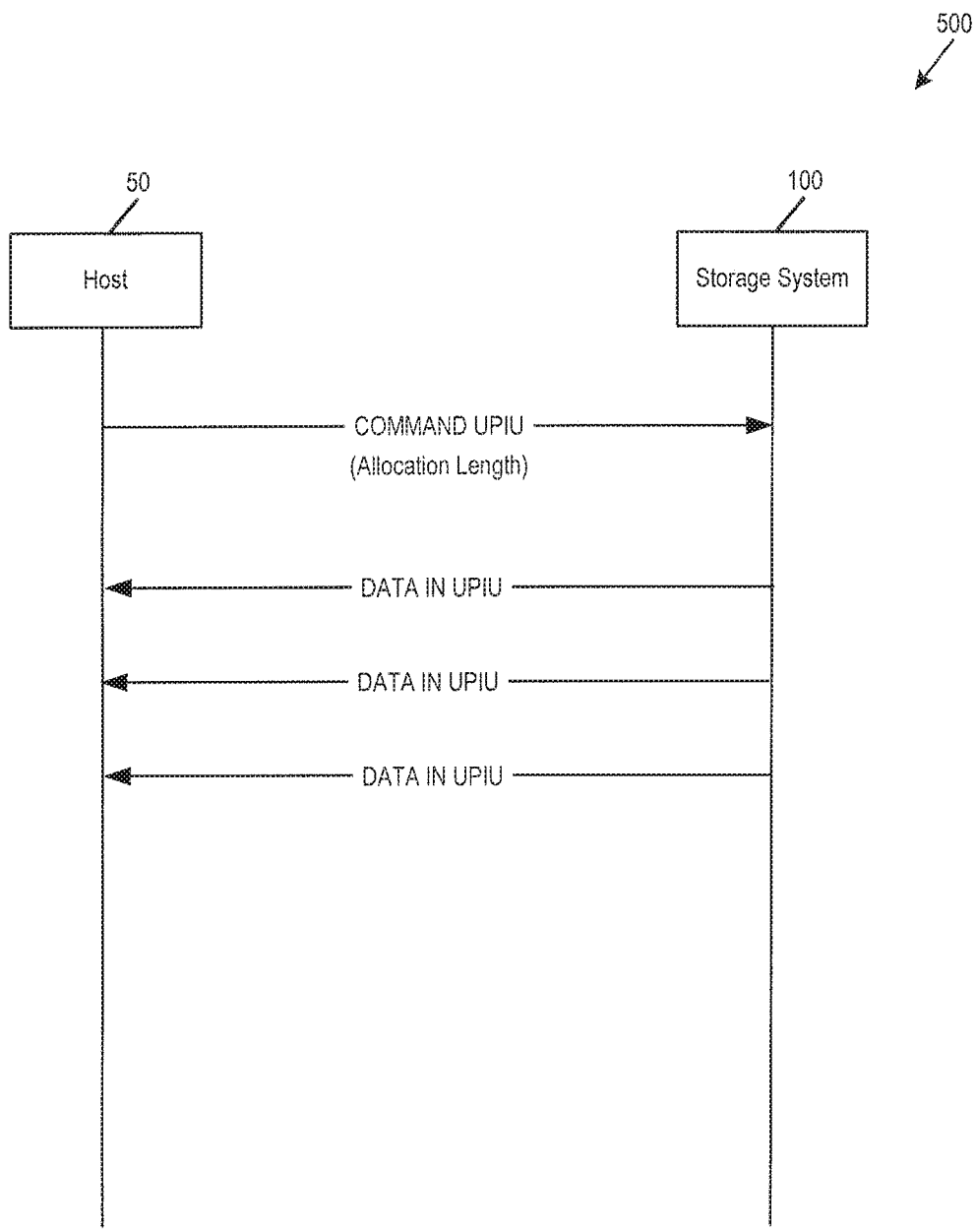
FIG. 5 is a flow diagram of an embodiment for a write host memory command.

In addition to or instead of a write command that is recognized by the storage system 100 as a read host memory command, the host 50 can send the storage system 100 a read command that is recognized by the storage system 100 as a write host memory command. This is shown in the flow diagram 500 in FIG. 5. In this example, the host 50 sends a standard read command to the storage system 100 as a UPIU command with the same command parameters as the write command, but with the command name being Write Host Memory. In response, the storage system 100 ignores the explicit read command and instead understands that a channel is open to write data to the host memory. In this example, the storage system 100 sends data in UPIU packets. As with the write command discussed above, the host keeps the communication channel open (ignoring any timeouts), so the storage system 100 can keep sending requests to write data from the host memory at will. The response UPIU to close out the read command can be sent from the storage system 100 during power off, for example.

By sending both a read host memory command and a write host memory command, the host 50 can establish the two-way channel between the host memory and the storage system 100, leaving the storage system in charge of when and how it wants to access the host memory.

The use of such a communication channel can be used for any suitable purpose. The following paragraphs provide several examples of use cases. However, it should be understood that these are merely examples, and other use cases can be used.

Figure 6:
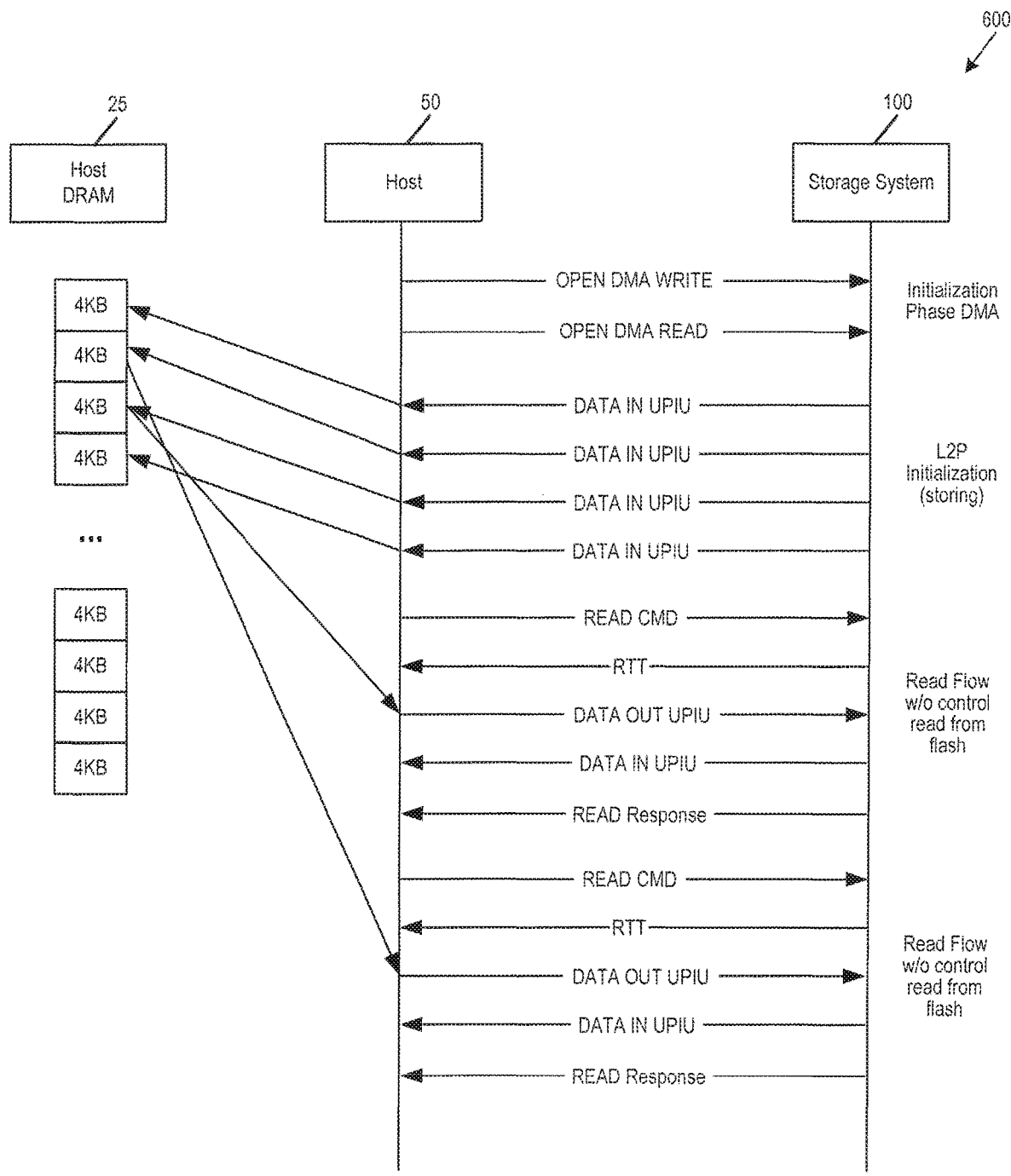
FIG. 6 is a flow diagram of an embodiment for a read performance booster.

Turning again to the drawings FIG. 6 is flow diagram 600 illustrating the use of this embodiment as a read performance booster. Here, there is an initialization phase in which both the read and write channels to the host memory (here, DRAM) 25 are established. Next, the storage system 100 sends part or all of a logical-to-physical (L2P) address table to the host 50 for storage in the host memory 25. This is desirable in situations where there is not enough space available in the storage system's volatile memory to store the table (resulting in a delay in accessing the table from the storage system's non-volatile memory 104). That is, after the host 50 sends a standard read command to the storage system 100, the storage system 100 can take the logical block address from that command and read the appropriate entry from the table stored in the host memory 25 (using the read host memory command), instead of incurring the time penalty of reading the table from the storage system's non-volatile memory 104.

Figure 7:
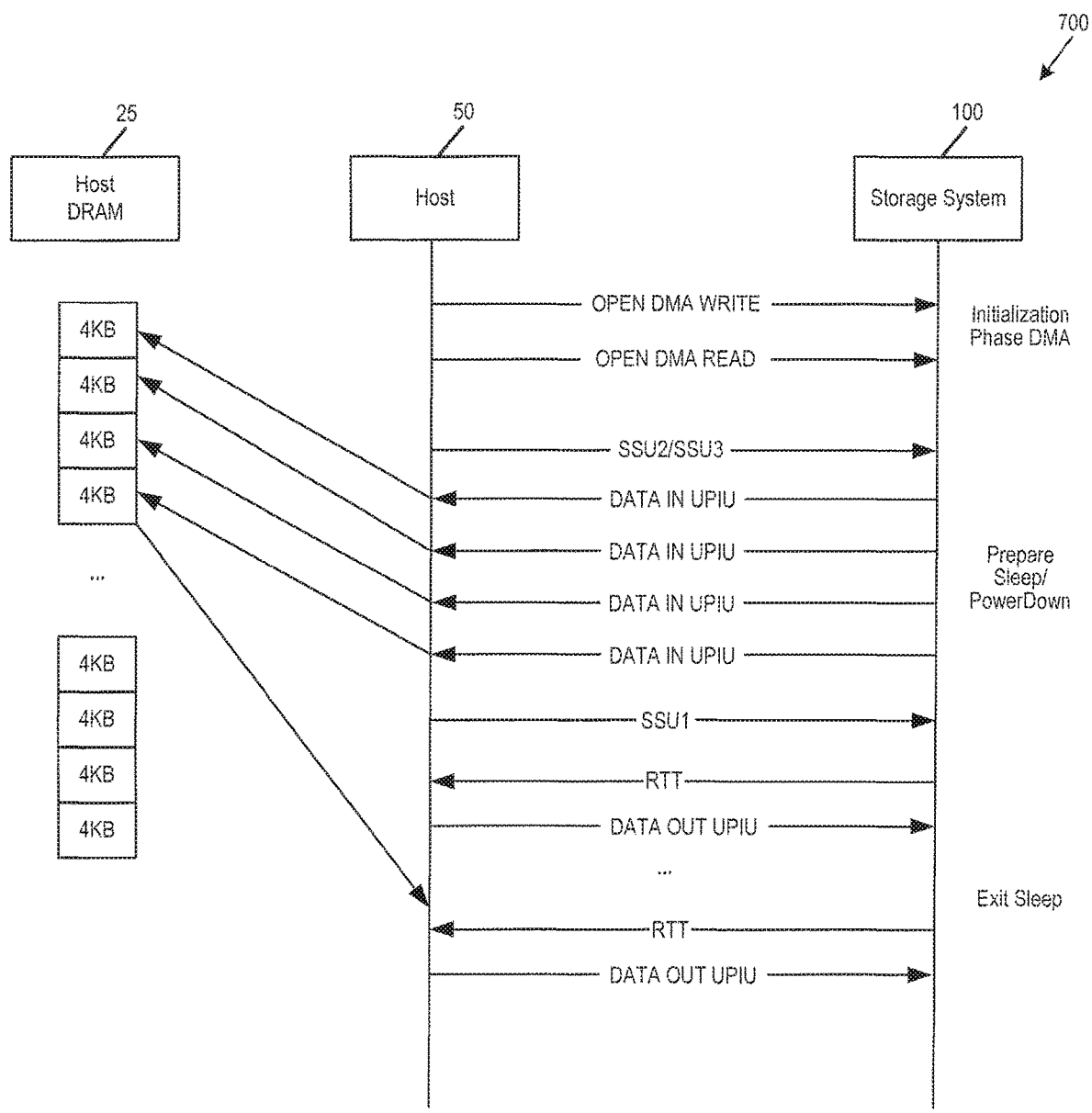
FIG. 7 is a flow diagram of an embodiment for fast powerup/wakeup.

As another example, which is shown in the flow diagram 700 in FIG. 7, the storage system 100 can use the write host memory command to store, in the host memory 25, data that was stored in the storage system's volatile memory (e.g., SRAM) prior to a sleep or power-down operation. That way, when the storage system 100 powers up, it can read the data back from the host memory 25 and store it in its SRAM, which is faster than if the storage system 100 had to store and read that data from its non-volatile memory 104.

Figure 8:
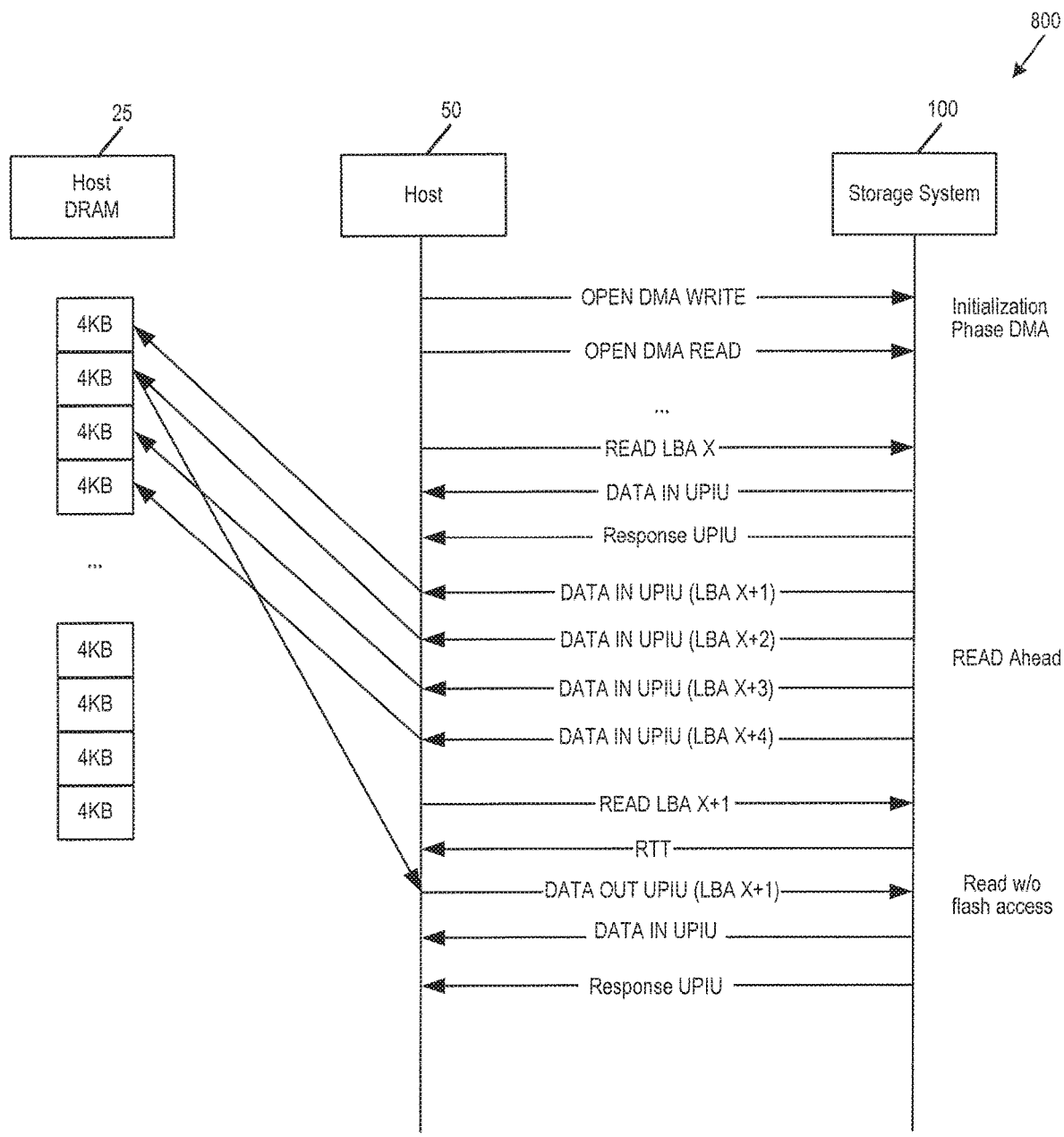
FIG. 8 is a flow diagram of an embodiment for an enhanced read ahead cache.

As yet another example, which is shown in the flow diagram 800 in FIG. 8, these embodiments can allow the storage system 100 to use the host memory as an enhanced read ahead cache. Here, after the storage system 100 reads data requested by the host 50 using a regular read command, the storage system 100 attempts to predict the next address that the host 50 may want read. For example, if the host 50 requested to read LBA X, the storage system 100 may predict that the host 50 will next want to read LBA X+1. So, using these embodiments, the storage system 100 can read LBA X+1 and store its data in the host memory 25. That way, if the host 50 later sends a read command to the storage system 100 for LBA X+1, the storage system 100 can read the data from the host memory 25 and return it to the host 50 instead of reading the data from the storage system's 100 non-volatile memory 104, thus saving time.

Figure 9:
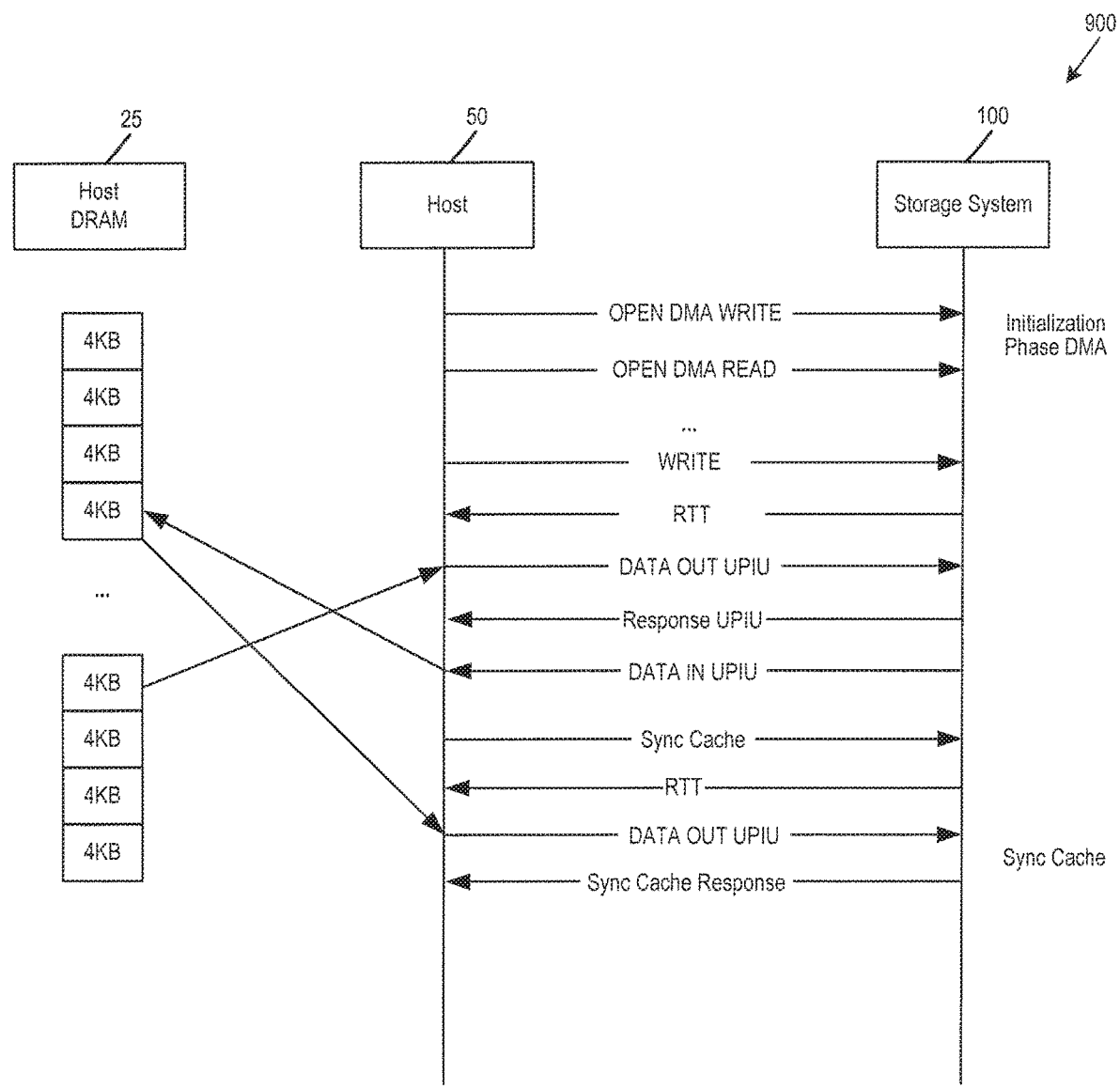
FIG. 9 is a flow diagram of an embodiment for an enhanced write cache.

Similarly, as shown in the flow diagram 900 in FIG. 9, the storage system 100 can use the host memory 25 as an enhance write cache. More specifically, when the host 50 sends the storage system 100 a write command with a data payload, instead of storing the data in the storage system's volatile memory prior to committing it to the storage system's non-volatile memory 104, the storage system 100 can write the data to the host memory 25 (using the host memory 25 as the storage system's internal cache). Later, the storage system 100 can read the data from the host memory 25 and flush it into the storage system's non-volatile memory 104.

For privacy purposes, the data that is saved to the host memory 25 may be encrypted. Most UFS hosts 50 already include in-line an Advanced Encryption Standard (AES) engine, which encrypts/decrypts data that is stored in/read from the storage system 100. Due to the symmetric nature of AES, when the storage system 100 writes data to the host memory 25, the host 50 automatically encrypts the data in DATA IN UPIU and decrypts the data when read in DATA OUT UPIU.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller configured to communicate with the memory and with a host comprising host memory, wherein the controller is further configured to:
receive a write command from the host, wherein the write command comprises a command name parameter that indicates that the write command and is actually a read host memory command sent by the host to initiate establishment of a read channel between the host memory and the controller;
in response to recognizing the write command as the read host memory command because of the command name parameter, establish the read channel between the host memory and the controller;
receive a read command from the host, wherein the read command comprises a command name parameter that indicates that the read command is actually a write host memory command sent by the host to initiate establishment of a write channel between the host memory and the controller;
in response to recognizing the read command as the write host memory command because of the command name parameter, establish the write channel between the host memory and the controller;
send, to the host via the write channel, at least a part of a logical-to-physical address table stored in the memory for storage in the host memory;
receive a read command from the host comprising a logical block address;
send, to the host via the read channel, an identification of a location in the host memory that stores an entry for the logical block address in the at least a part of the logical-to-physical address table stored in the host memory; and
receive, from the host via the read channel, the entry for the logical block address; wherein:
the write and read channels are kept open until the storage system powers off; and
the host is configured to ignore timeouts to keep the write and read channels open.

2. The storage system of claim 1, wherein the write command comprises a first parameter that identifies a start address of an area of the host memory designated for use by the storage system and a second parameter that identifies a size of the area.

3. The storage system of claim 1, wherein the identification of the location in the host memory is sent as pail of a ready-to-transfer response to the write command.

4. The storage system of claim 1, wherein the identification of the location in the host memory comprises an address offset and payload size.

5. The storage system of claim 1, wherein:
the write command further comprises a logical block address, and
the controller is further configured to ignore the logical block address.

6. The storage system of claim 1, wherein the host memory comprises a first area designated for se by the storage system to read and write data, a second area designated for storing data read from the storage system by the host, and a third area designated for storing data to be written to the storage system by the host, the first, second, and third areas being non-overlapping areas.

7. The storage system of claim 1, wherein the memory comprises a three-dimensional memory.

8. The storage system of claim 1, wherein the controller is further configured to receive a request from the host to enter a sleep state while keeping several commands active.

9. The storage system of claim 1, wherein the controller is further configured to be able to signal the host irrespective of whether a link connecting the host and the storage system is in a low-power mode.

10. The storage system of claim 1, wherein the host is further configured to enable a storage sleep state.

11. The storage system of claim 1, wherein the storage system is configured to be integrated in the host.

12. A method comprising:
performing the following in a storage system in communication with a host comprising host memory, wherein the storage system comprises a memory and a controller:
receiving a read command from the host, wherein the read command comprises a command name parameter that indicates that the read command is actually a write host memory command sent by the host to initiate establishment of a write channel between the host memory and the controller;

in response to recognizing the read command as the write host memory command because the command name parameter indicates that the read command is the write host memory command, establishing the write channel between the host memory and the controller;

receiving a read command from the host comprising a logical block address in the memory; and in response to receiving the read command:
  predicting a next logical block address to be read requested by the host; and
  sending, to the host via the write channel, data stored in the next logical block address in the memory for storage in the host memory;

wherein:
  the write channel is kept open until the storage system powers off; and
  the host is configured to ignore timeouts to keep the write channel open.

13. The method of claim 12, wherein the host is further configured to enable a storage sleep state.

14. The method of claim 12, further comprising:
receiving a write command from the host, wherein the write command comprises a command name parameter that indicates that the write command is actually a read host memory command sent by the host to initiate establishment of a read channel between the host memory and the controller; and in response to recognizing the write command as the read host memory command because the command name parameter indicates that the write command is the read host memory command, establishing the read channel between the host memory and the controller.

15. The method of claim 14, further comprising:
receiving a read command from the host comprising the next logical block address;
reading, via the read channel, the data stored in the host memory; and
sending the data to the host in response to the read command comprising the next logical block address.

16. The method of claim 14, further comprising:
receiving a write command from the host with a data payload; and
sending, to the host via the write channel, the data payload for storage in the host memory instead of storing the data payload in a volatile memory in the storage system.

17. The method of claim 14, wherein the read channel is kept open until the storage system powers off.

18. The method of claim 14, wherein the host is further configured to ignore timeouts to keep the read channel open.

19. A storage system comprising:
a memory;
a controller;
means for receiving a write command from a host comprising host memory, wherein the write command comprises a command name parameter that indicates that the write command is actually a read host memory command sent by the host to initiate establishment of a read channel between the host memory and the controller;

means for establishing Rail the read channel between the host memory and the controller in response to recognizing the write command as the read host memory command because the command name parameter indicates that the write command is the read host memory command;

means for receiving a read command from the host, wherein the read command comprises a command name parameter that indicates that the read command is actually a write host memory command sent by the host to initiate establishment of a write channel between the host memory and the controller;

means for establishing the write channel between the host memory and the controller in response to recognizing the read command as the write host memory command because the command name parameter indicates that the read command is the write host memory command;

means for sending, to the host via the write channel, data stored in a volatile memory in the storage system prior to a sleep or power-down operation;

means for sending, to the host via the read channel after powering up after sleep or power-down, an identification of a location in the host memory that stores the data; and means for receiving, from the host via the read channel, the data;

wherein:
  the write and read channels are kept open until the storage system powers off; and
  the host is configured to ignore timeouts to keep the write and read channels open.

* * * * *